United States Patent [19]

Bonzer

[11] Patent Number: 5,131,246

[45] Date of Patent: Jul. 21, 1992

[54] TIRE COVER LATCHING MECHANISM

[76] Inventor: Robert L. Bonzer, 37 Wheelhouse Ct., Long Beach, Calif. 90803

[21] Appl. No.: 703,377

[22] Filed: May 21, 1991

[51] Int. Cl.⁵ .................. E05B 65/12; E05C 19/12
[52] U.S. Cl. ................................. 70/260; 292/113; 292/DIG. 60
[58] Field of Search .............. 70/15, 18, 19, 260, 70/57; 292/113, DIG. 49, DIG. 60

[56] References Cited

U.S. PATENT DOCUMENTS

| | | | |
|---|---|---|---|
| 901,419 | 10/1908 | Carlson | 292/113 |
| 1,304,785 | 5/1919 | Donnelly | 70/18 |
| 1,796,709 | 3/1931 | Halvorson | 292/113 |
| 2,028,223 | 1/1936 | Lambert | 70/260 |
| 2,104,156 | 1/1938 | Ferguson | 70/260 |
| 3,245,240 | 4/1966 | De Forrest | 70/158 |
| 3,259,411 | 7/1966 | Griffiths | 292/113 |
| 3,318,624 | 5/1967 | Doe et al. | 292/113 |
| 3,592,028 | 7/1971 | LaMonica | 70/57 |
| 3,831,224 | 8/1974 | MacMaster et al. | 292/113 |
| 3,939,678 | 2/1976 | Wagoner | 70/19 |

Primary Examiner—Renee S. Luebke
Assistant Examiner—D. Boucher

[57] ABSTRACT

A latching mechanism for the split-ring tire cover of an automotive vehicle. The latching mechanism includes a latch handle pivotally connected to a hooked tongue that is engageable with one end of the tire cover to releasably secure the two ends of the tire cover together. A key-operated lock is interposed between the latch handle and the tongue.

8 Claims, 2 Drawing Sheets

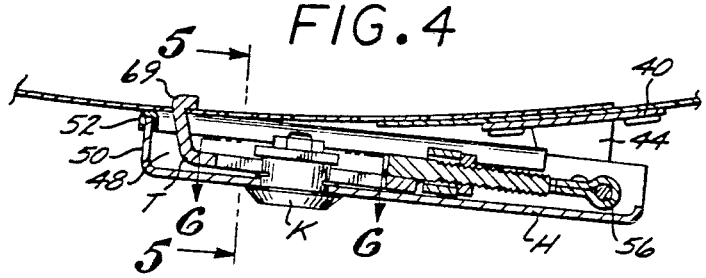
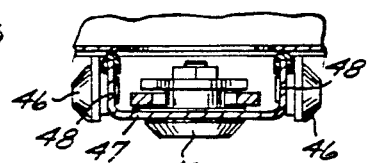
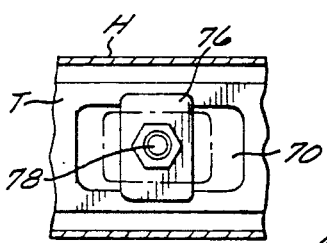
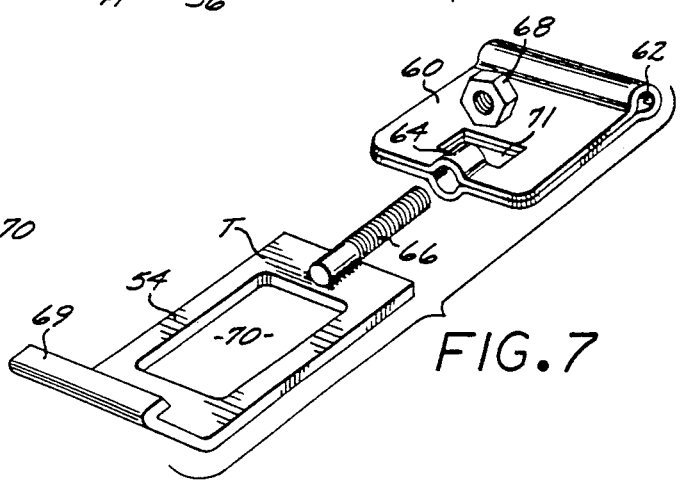
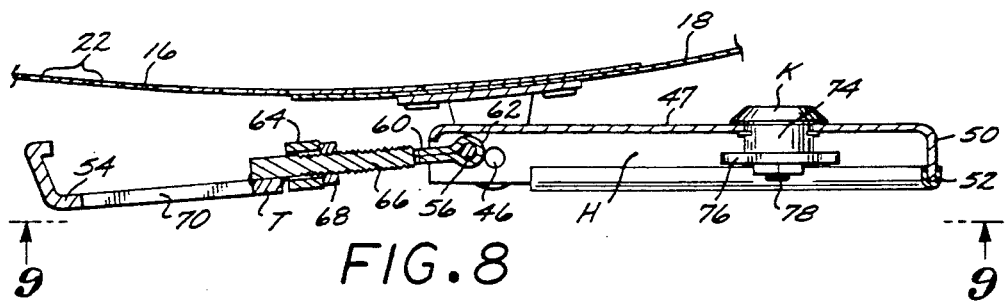
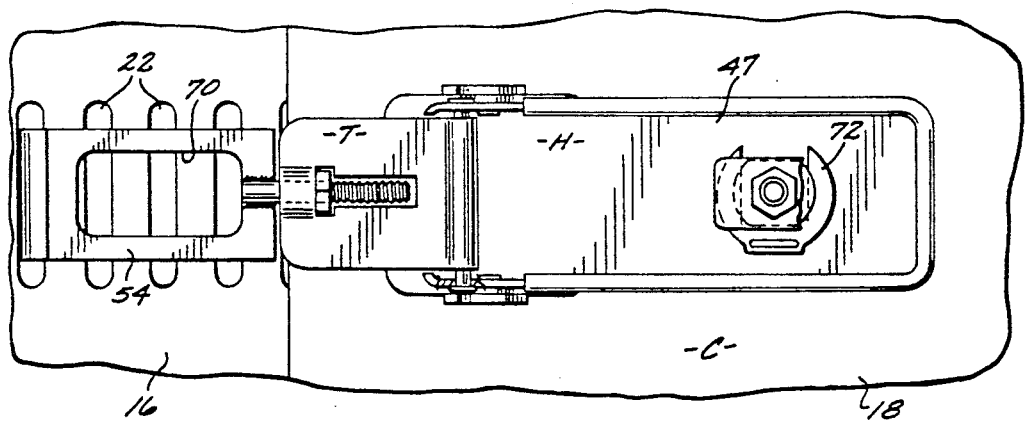

TIRE COVER LATCHING MECHANISM

BACKGROUND OF THE INVENTION

Automotive vehicles, particularly of the van type, often utilize a spare tire carried exteriorly of the vehicle. The spare tire is provided with a decorative split-ring tire cover, generally of metallic construction. Latching mechanisms have been provided for releasably securing together the ends of the split ring tire covers. Such latching mechanisms utilize a bracket secured to one end of the split-ring tire cover. A hooked tongue on such mechanisms releasably engage with one of a plurality of openings formed in the other end of the split-ring tire cover. The tongue is pivotally carried by an elongated latch body which is in turn pivotally carried by the bracket. The latch body and tongue are releasably connected together by a latching lug which extends from the tongue through a slot formed in the latch body, with the lug having a hole which receives a conventional padlock. The utilization of the padlock detracts from the aesthetic appearance of the tire cover. Additionally, the padlock is easily accessible to potential thieves. Another disadvantage of prior art latching mechanisms is that vibration of the padlock produces an annoying rattle. Also, the padlock can be lost when disengaged from the latching mechanism.

SUMMARY OF THE INVENTION

The present invention is directed to an improved latching mechanism for releasably connecting the ends of a split-ring tire cover, such mechanism utilizing an integral key-operated locking mechanism rather than the padlock-type lock of the prior art. The latching mechanism of the present invention eliminates the aforedescribed disadvantages of prior art latch mechanisms of this nature, and in particular provide a more pleasing appearance for the tire cover, renders the latching mechanism more resistant to theft and eliminates annoying rattles.

BRIEF DESCRIPTION OF THE DRAWINGS

FIG. 4 is a sectional view taken in enlarged scale along line 4—4 of FIG. 3 showing the parts of the latching mechanism in a latched position;

FIG. 5 is a sectional view taken along line 5—5 of FIG. 4;

FIG. 6 is a broken sectional view taken along line 6—6 of FIG. 4;

FIG. 7 is a perspective view of a tongue member utilized in the aforesaid latching mechanism;

FIG. 8 is a sectional view similar to FIG. 4 but showing the parts of the latching mechanism in an unlatched position; and FIG. 9 is a bottom view of the latching mechanism taken along line 9—9 of FIG. 8.

DETAILED DESCRIPTION OF A PREFERRED EMBODIMENT

Figure 3:
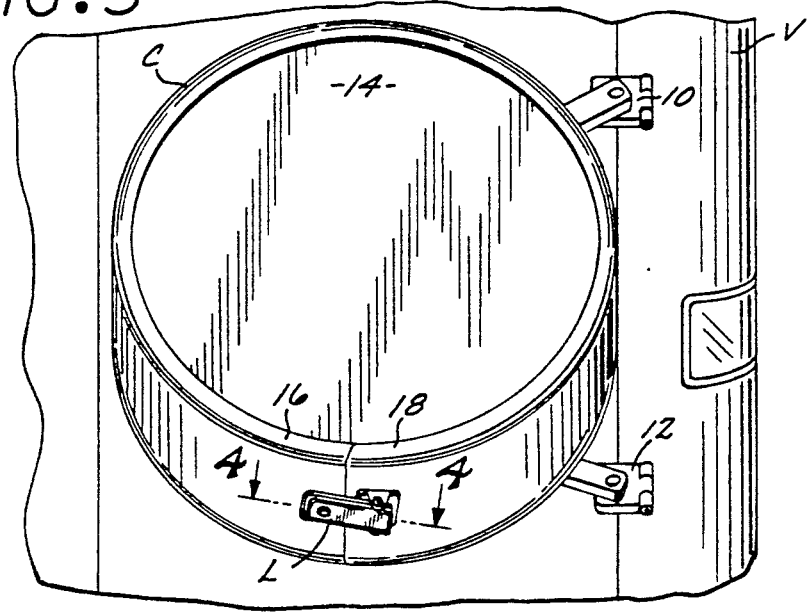
FIG. 3 is a perspective view showing a split-ring tire cover provided with a latching mechanism embodying the present invention mounted on a vehicle.

Referring first to FIG. 3, there is shown a conventional split-ring tire cover C for a spare tire and wheel (not shown) connected to the rear of a vehicle V by brackets 10 and 12. The spare tire and wheel are hidden from view by a plastic or metal face plate 14. A latching mechanism L embodying the present invention is employed to releasably secure together the ends 16 and 18 of the tire cover C.

Figure 1:
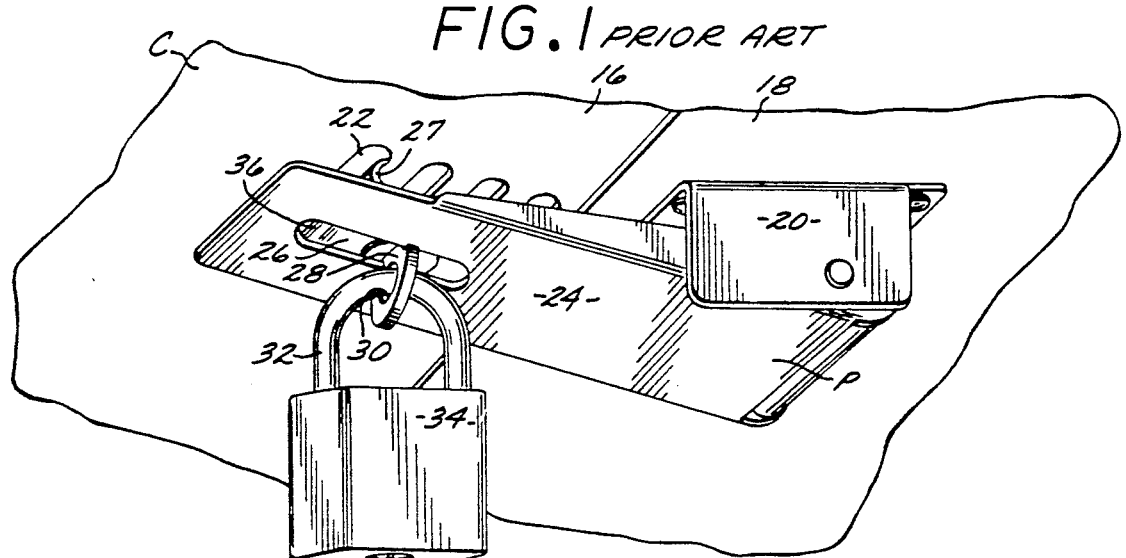
FIG. 1 is a perspective view of a prior art latching mechanism for a split-ring tire cover.
Figure 2:
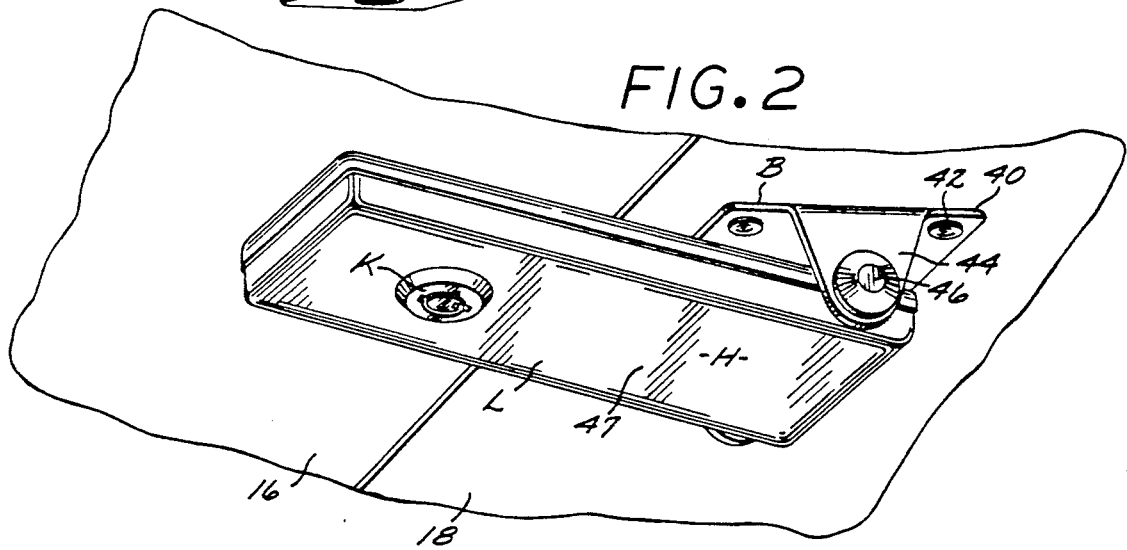
FIG. 2 is a perspective view similar to FIG. 1 but showing a preferred form of latching mechanism for a split-ring tire cover embodying the present invention.

Referring now to FIG. 1, there is shown a prior art latching mechanism P utilized to releasably connect together the ends 16 and 18 of a conventional split-ring tire cover C. The prior art latching mechanism includes a bifurcated bracket 20 secured as by rivets to one end 18 of the tire cover. The opposite end 16 of the tire cover is shown formed with a plurality of circumferentially spaced, aligned openings 22. The latching mechanism P includes a latch handle 24 pivotally secured at one end to the bracket 20. An elongated tongue 26 is pivotally carried by the latch handle 24 and is formed at one end with a hook 27 selectively engageable with any one of the openings 22. Tongue 26 supports a latch lug 28 having an opening 30 to receive the hasp 32 of a conventional padlock 34. The latch lug 28 is rotatable relative to the tongue 26 whereby it can be aligned with a slot 36 formed on the latch lug 28. It should be understood that with the padlock in place, the latch handle and tongue are secured against relative movement whereby the tongue hook 27 cooperates with the latching handle to secure the two ends of the split-ring tire cover together. When access to the spare tire and wheel is desired, the padlock is unlocked and its hasp 32 withdrawn from opening 30. Thereafter, the latch lug 28 is rotated into alignment with slot 36 to permit the latch handle to be pivoted away from the tire cover C so as to withdraw tongue hook 27 from within opening 22. The tire cover can then be removed for access to the spare tire.

Referring now to the remaining figures, a preferred form of latching mechanism L embodying the present invention includes a bifurcated bracket B having a flat plate 40 secured by rivets 42 to one end 18 of a conventional split-ring tire cover C. A pair of ears 44 integrally extend away from face plate 40 and are apertured to receive a pair of pivot pins 46.

The latching mechanism also includes a generally dish-shaped latch handle H having a bottom wall 47, sidewalls 48 and an end wall 50. A rattle-absorbent pad 52 formed of a suitable rubber or synthetic material encompasses the sidewalls 48 and end walls 50.

An elongated tongue T formed at its free end with a hook member 54 is pivotally connected at one end to the latch handle H by a transverse pivot pin 56. As shown particularly in FIG. 7 tongue T includes a mounting ear 60 having a bore 62 through which extends pivot pin 56. The end of the mounting ear 60 opposite bore 62 is formed with a tube 64 through which extends a threaded post 66 which is threadably engaged with an adjustment nut 68 disposed within a gap 70 formed in mounting ear 60. The opposite end of threaded post 66 is welded to the hook member 54. Hook member 54 is formed with a rectangular aperture 70. The end of hook member 54 opposite pivot pin 56 is formed with a lip 69 that is releasably insertable into a selected one of tire cover openings 22.

A key operated lock K is carried by the intermediate portion of the bottom wall 47 of latch handle H, as by means of a conventional C-clip 72. Key operated lock K is of conventional construction and may be of the type sold by Shin Shyu Enterprise Co., Inc. 65 No. 10 Lane 4٥٢ Tun Hua S. Road, Taipei, Taiwan 10649. Lock K includes a cylindrical housing 74 for a conventional key-operated mechanism (not shown). The lock also includes a keeper plate 76 rotatably connected to the housing 74 by a shaft 78. As shown particularly in FIG. 6, keeper plate 76 is of rectangular configuration having a length greater than the width of the aperture 70 formed in the hook member 54 of tongue T (See FIG. 7). The keeper plate 76 is rotated by means of a key (not shown) inserted into the key-operated mechanism of housing 74 so as to be rotated between its solid and dotted outline positions of FIG. 6. With the keeper plate 76 in its solid outline position, its ends overlie the sides of aperture 70 so as to secure the tongue against pivotal movement relative to the latch handle H. With keeper plate 76 rotated to its dotted outline position of FIG. 6, latch handle H may be pivoted away from tongue T.

In the operation of the aforedescribed latching mechanism, the parts will be arranged as shown in FIGS. 2 through 6 when the tire cover C is arranged in its closed position. The lip 69 of tongue T is hooked within one of the openings 22 on end 16 of the tire cover so as to secure the tire cover ends 16 and 18 against relative movement. At this time the rattle-absorbent pad 52 abuts the tire cover C in a non-rattling fashion. When the tire cover C is to be opened, the key-operated lock K is actuated so as to rotate keeper plate 76 from its solid outlined position of FIG. 6 to its dotted outline position thereof. The latch handle H can then be pivoted away from the tongue to its position of FIG. 8. During such pivotal movement, the axis of tongue pivot pin 56 will follow a circular path around the axis of latch handle pivot pins 46 so as to increase the effective length of tongue T whereby lip 69 thereof can be withdrawn from tire cover opening 22. The tire cover C can then be opened so as to provide access to the spare tire.

It should be particularly noted that the length of tongue T can be easily adjusted by rotating hook member 54 relative to mounting plate 60 so as to accommodate the variations in spacing between the tire cover openings 22. It should also be noted that the aforedescribed latching mechanism enhances the aesthetic appearance of the tire cover C rather than to detract therefrom as in the case of the padlock-type prior art latching mechanisms. The key for operating the aforedescribed mechanism may conveniently be carried on the driver's usual keyring.

Various modifications and changes may be made with respect to the foregoing detailed description without departing from the spirit of the present invention.

I claim:

1. A spilt-ring tire cover latching mechanism for releasably connecting the ends of a split-ring tire cover, one end of said split-ring tire cover being formed with a plurality of circumferentially spaced and longitudinally aligned openings, said latching mechanism comprising:
    a bifurcated bracket securable to the end of said split-ring tire cover opposite said openings;
    an elongated generally dish-shaped latch handle having one end pivotally carried by the bifurcated bracket for pivotal movement about a first transverse pivot axis between a latched position wherein its free end extends over said openings in said split-ring tire cover and an unlatched position wherein its free end is swung away from said openings;
    an elongated tongue formed at its free end with a hook, said tongue having one end pivotally carried by a transverse pivot pin on said latch handle for pivotal movement about a second transverse pivot axis spaced form the first pivot axis between a latched position within the confines of said latch handle wherein said hook is engaged within one of said openings in said split-ring tire cover, and an unlatched position wherein said hook is free of said openings, and with an elongated slot being formed in the intermediate potion of the tongue;
    a lock carried by the intermediate portion of the latch handle, said lock including a housing for a key-operated mechanism secured to the latch body and extendable through said slot, said lock also including a keeper plate rotatably connected to the lock housing for rotatable movement by the key-operated mechanisms between attached position wherein the keeper plate overlies said slot and an unlatched position wherein the keeper plate is aligned with said slot; and
    with said latch handle completely enclosing said tongue.

2. A latching mechanism as set forth in claim 1 wherein a rattle-absorbent pad is secured to the latch handle to engage the tire cover.

3. A latching mechanism as st forth in claim 1 wherein the tongue is adjustable in length.

4. A latching mechanism as set forth in claim 2 wherein the tongue is adjustable in length.

5. A latching mechanism as set forth in claim 2 wherein the tongue includes a mounting each having a transverse pivot pin bore to receive said pivot pin of the latch handle and a longitudinal tube that receives a longitudinal threaded adjustment post, said tongue being secured to the end of said threaded adjustment post opposite said mounting each, with the end of said tongue being formed with said hook.

6. A latching mechanism as set forth in claim 1 wherein said latch handle includes a bottom wall, a pair of sidewalls and an end wall, and a rattle-absorbent pad encompasses the sidewalls and end walls.

7. A latching mechanism as set forth in claim 2 wherein said latch handle includes a bottom wall, a pair of sidewalls and an end wall, and said rattle-absorbent pad encompasses the sidewalls and end walls.

8. A latching mechanism as set forth in claim 5 wherein said latch handle includes a bottom wall, a pair of sidewalls and an end wall, and said rattle-absorbent pad encompasses the sidewalls and end walls.

* * * * *